Sept. 25, 1951  B. B. JUNKUNC  2,569,173
TOP STRUCTURE FOR VENETIAN BLINDS
Filed Nov. 21, 1947  2 Sheets-Sheet 1
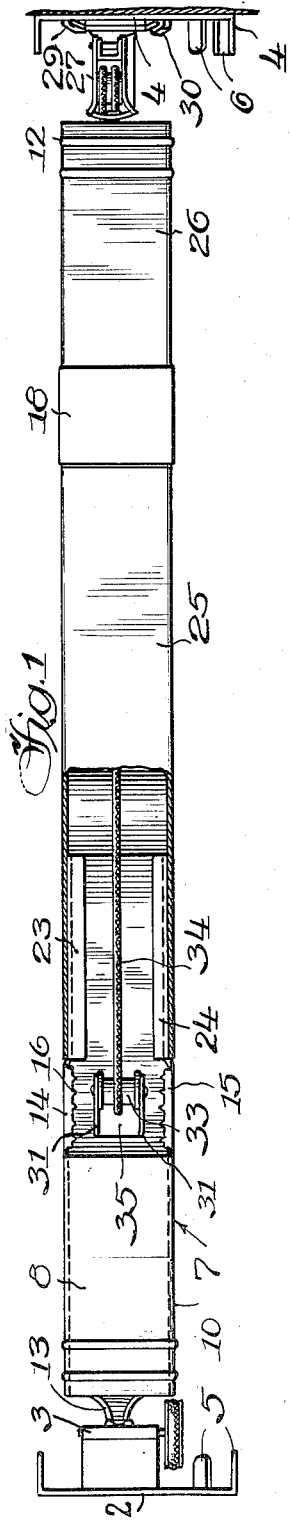
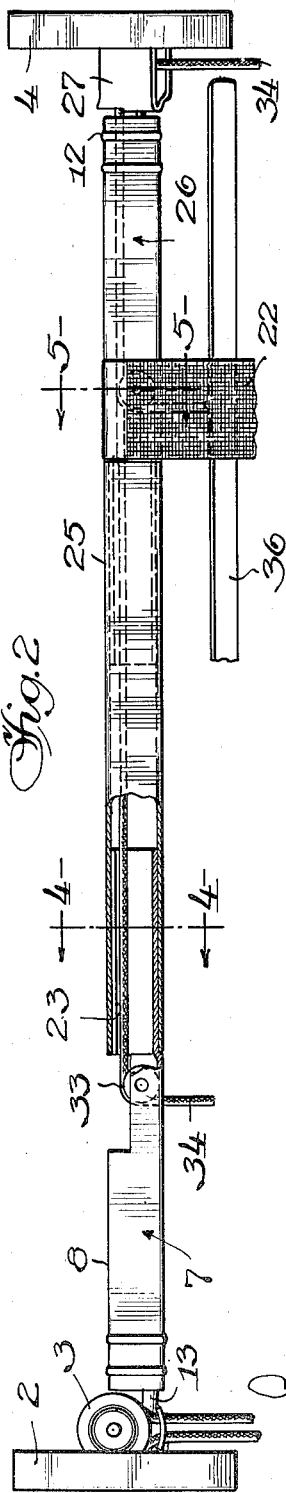
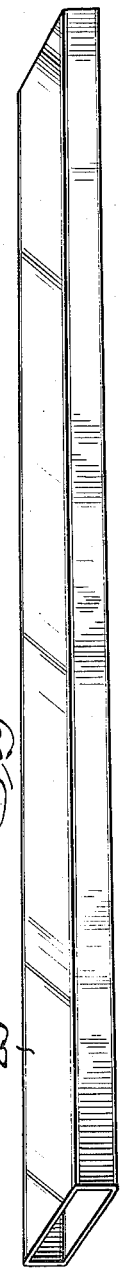
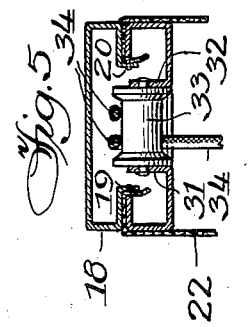
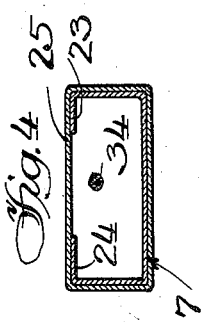
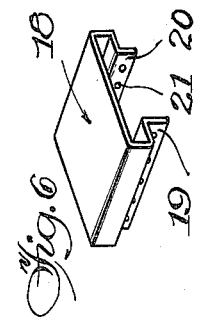
INVENTOR.
Bela B. Junkunc
BY Schneider & Dressler
Attys.

Sept. 25, 1951   B. B. JUNKUNC   2,569,173
TOP STRUCTURE FOR VENETIAN BLINDS
Filed Nov. 21, 1947   2 Sheets-Sheet 2
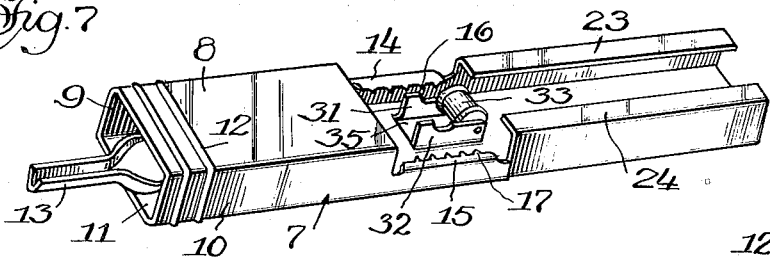
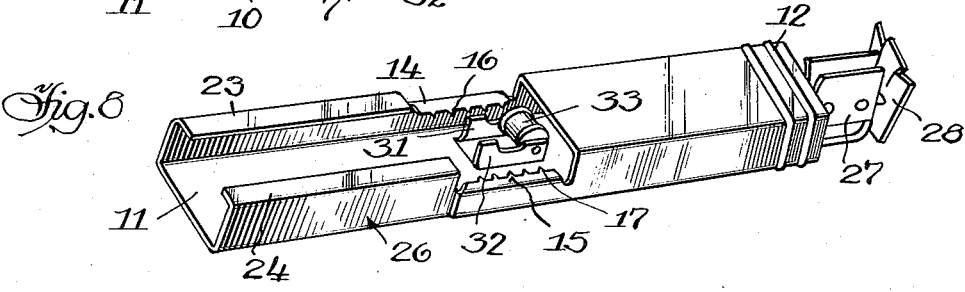
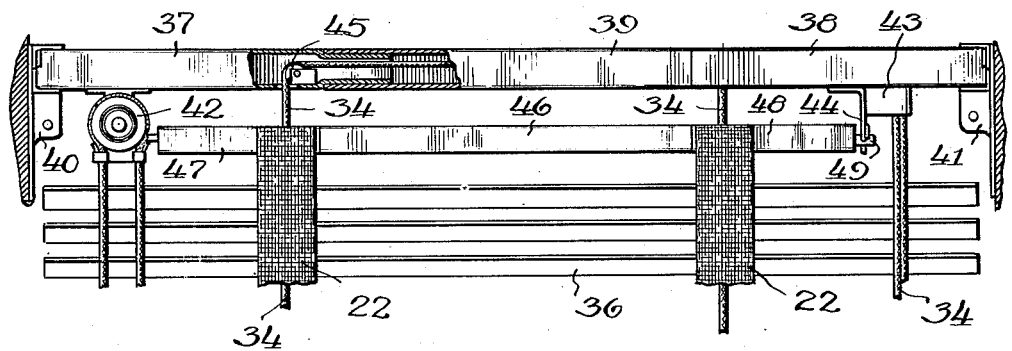
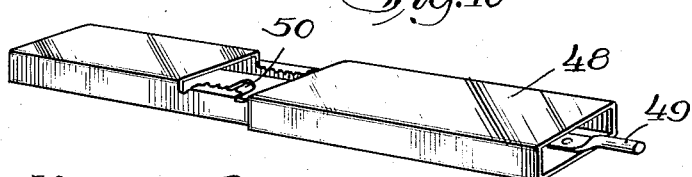
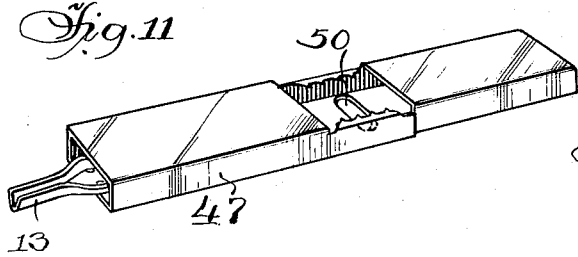
INVENTOR.
Bela B. Junkunc
BY
Schneider & Dressler
Attys.

Patented Sept. 25, 1951

2,569,173

UNITED STATES PATENT OFFICE 2,569,173

TOP STRUCTURE FOR VENETIAN BLINDS

Bela B. Junkunc, Chicago, Ill., assignor to Bela B. Junkunc, Alexander Junkunc, Sr., Alexander Junkunc, Jr., and Joseph G. Junkunc, doing business as J & J Tool & Machine Co., Chicago, Ill., a partnership Application November 21, 1947, Serial No. 787,271

3 Claims. (Cl. 160—173)

This invention relates to a top structure for Venetian blinds, and particularly to a one or two rail structure that is built of stock end sections and an intermediate section cut to the desired length to make the overall length of the top structure fit any requirements.

The top structure of conventional Venetian blinds includes a head rail which furnishes support for a blind raising cord or cords, and a tilt rail which controls the angular relationship of the slats of the blind. In the conventional assembly of Venetian blinds, it has heretofore been necessary to make the rails to order because of the impracticability of keeping sufficient different sizes of rails in stock to meet all requirements. This necessitates cutting the lumber to proper length, marking it for screws and cut-outs, drilling, making the cut-outs, and then securing individual pieces of hardware to the rail. This method of assembly is slow, inefficient and expensive.

In my prior application, Serial No. 780,184, filed October 16, 1947, I have disclosed a Venetian blind in which the tilt rail and bottom rail are made in sections so that standard prefabricated parts can be used. However, even with this improved structure, the head rail still must be made to order.

In the structure constituting the present invention the head rail is also built in sections using prefabricated standard end sections, so that only the intermediate section, which is a plain tubular member, is cut to length to fit the particular job, and the assembly of the complete blind is simplified considerably. The present invention also encompasses a structure in which a single rail serves as the entire top structure. Combining the head rail and the tilt rail in a single unit eliminates one part and cheapens the cost of the blind. The stock parts are cut and drilled, and the necessary hardware is secured to these standard parts at the factory, so that the only cutting that must be done by the assembler is the cutting of the intermediate section to the length necessary to make the total length of the rail fit the span of the opening to be bridged by the blind.

The structure by which the above advantages are attained will be described in the following specification, taken in conjunction with the accompanying drawings, in which:

Figure 1 is a top elevation of a combined head and tilt rail embodying the present invention, with a portion of the top broken away to facilitate illustration of the interior structure;

Fig. 2 is a side elevation of the structure shown in Fig. 1, with a portion of the side broken away;

Fig. 3 is a perspective view of the intermediate section of tailored length used to join the two standard prefabricated end sections;

Fig. 4 is a cross sectional view taken along the line 4—4 of Fig. 2;

Fig. 5 is a cross sectional view taken along the line 5—5 of Fig. 2;

Fig. 6 is a detail perspective view of a resilient clip for holding the ends of the tapes;

Fig. 7 is a detail perspective view of one prefabricated end section having a key projecting from its end for engagement with a conventional tilting mechanism;

Fig. 8 is a detail perspective view of the other prefabricated end section which has a rotatable cord lock and a wing member for engagement with a supporting bracket;

Fig. 9 is a fragmentary side elevation of the top portion of a Venetian blind showing a modified embodiment of the invention having a sectional head rail and a separate sectional tilt rail, with a portion of the head rail broken away to show the interior structure;

Fig. 10 is a detail perspective of one of the prefabricated end sections of the tilt rail of the modified embodiment of the invention; and Fig. 11 is a detail perspective of the other prefabricated end section of the modified embodiment.

In the drawings, the reference numeral 2 indicates an end support having a conventional rail tilting mechanism 3 permanently secured thereto. Support 2 is attached to one side of the window in a conventional manner. A supporting bracket 4 is attached to the opposite side of the window. Both supporting members 2 and 4 are provided with flanges 5 and 6 for receiving the ends of a facia board (not shown).

One end section 7 of the combined head and tilt rail, shown in Fig. 7, comprises a tubular portion having a top wall 8, side walls 9 and 10, and a bottom wall 11. Ridges 12 encircle the tubular portion adjacent one end to reinforce it. A key 13 is rigidly secured to bottom wall 11 in any suitable manner with a portion projecting beyond the end of the tubular portion. The projecting portion or key 13 has a V-shaped cross section and fits into a suitably shaped aperture (not shown) in tilting mechanism 3. The key may be of any non-circular cross section, and the aperture in tilting mechanism 3 will be similarly shaped.

Top wall 8 and a portion of side walls 9 and 10 are cut away adjacent the center of end section 7. Flanges 14 and 15, provided with serrated edges 16 and 17, are bent inwardly from the bottom portion of side walls 9 and 10. A resilient clip member 18, shown in detail in Fig. 6, has inset depending flanges 19 and 20 provided with apertures 21 cooperating with the serrations 16 and 17 to hold the ends of a conventional tape 22. Clip member 18 is of the same length as the cut away portion.

The portion of section 7 to the right (as viewed in Fig. 7) of the cut away portion has the central portion of top wall 8 removed so as to leave only a pair of inwardly extending flanges 23 and 24 for a top. This arrangement provides the resiliency necessary for this portion of the end section to be telescoped into the end of a tubular intermediate section 25, shown in detail in Fig. 3. The length of section 25 is tailored to make the overall length of the rail fit the space to be bridged by the blind.

The other end section 26 is similar to section 7, except for a cord lock 27 projecting from the open end of the tubular portion; instead of the key 13. The cord lock is rotatable relative to end section 26. A wing member 28 is rigidly secured to the cord lock and is adapted to engage flanges 29 and 30 projecting inwardly from bracket 4. Wing member 28 is wider at its top than at the bottom and the sides thereof converge toward the bottom so that when the wing member is slid into flanges 29 and 30 it will remain in place. The rail comprising end sections 7 and 26 and intermediate section 25 can rotate, within the limits of movement permitted by tilting mechanism 3, relative to supports 2 and 4.

It is to be noted that both end sections are of standard length, and the length of the intermediate section determines the width of the blind. Both end sections have flanges 31 and 32 struck up from bottom wall 11 and a pulley 33 is rotatably mounted therebetween. Instead of flanges struck up from the bottom wall a separate channel member may be welded thereto as in my prior copending application referred to above. The axis of pulleys 33 is transverse of the rail so that a blind raising cord 34 can move over the pulleys, through intermediate section 25, and through cord lock 27.

Cord 34 is secured to the bottom rail of the blind in conventional manner. In the embodiment illustrated, the openings 35 formed by striking up flanges 31 and 32 permit cord 34 to pass from the rail through the slats 36 to the bottom rail. If channel members are welded in the end section the necessary apertures are formed by drilling holes through the bottom wall and the bottom of the channel members.

The positioning of rollers 33 in the end sections makes it unnecessary to drill holes in the intermediate section, and the cord is always spaced uniformly from the outer edges of the blind. If the blind is wide enough to require more than a single cord adjacent each edge, the intermediate section can be provided with apertures and each end of the cord can be extended from the bottom rail back to the tilt rail where the ends can be anchored. This compound pulley arrangement provides more pulling power for the cord. The provision of pulleys 33 in the end sections of the tilt rail permits the tilt rail to function as a head rail as well as a tilt rail.

In the embodiment illustrated in Figs. 9 to 11, a head rail comprising two end sections 37 and 38, of standard length, and an intermediate section 39, of a length tailored to fit the desired overall length, is mounted in conventional supporting brackets 40 and 41. A tilting mechanism 42 depends from the bottom wall of end section 37 and a cord lock 43 is secured to the bottom wall of section 38. A supporting bracket 44 also depends from the bottom wall of section 38. Pulleys 45 are rotatably mounted in end sections 37 and 38 as described above, and the cord 34 moves over the pulleys, through intermediate section 39 and through cord lock 43.

The head rail may be made of wood, although metal is preferred, or the end sections may be of wood and the intermediate section of metal. The sectional construction of the head rail permits it to be tailored to fit any desired window opening by making the intermediate section of the proper length without disturbing the arrangement of the hardware which is attached to the end sections at the factory without reference to the ultimate width of the completed blind.

Tilt rail 46 is also made sectional so that its length may be made to conform to the spacing between tilting mechanism 42 and bracket 44. End section 47 has a key 13 engaging tilting mechanism 42, and end section 48 has a stud 49 engaging and rotating in bracket 44. End sections 47 and 48 are similar to end sections 7 and 26 except that pulleys 33 are omitted, and no cord lock is attached to end section 48. The end sections are provided with apertures 50 for cord 34 to pass through. The ends of tapes 22 are secured to end sections 47 and 48 in the same manner as with end sections 7 and 26.

Although I have described a preferred embodiment of my invention and one modification thereof, in detail, it is to be understood that the details of these embodiments are not intended to be limitations upon my invention, since these details may be modified or changed without departing from the spirit or scope of the invention. Accordingly, I do not desire to be restricted to the exact structures shown and described, except as limited by the appended claims.

I claim:

1. In a Venetian blind, a sectional tilt rail comprising two end sections each having a hollow extension, a pulley rotatably mounted in each of said end sections, a tubular intermediate section telescoped over said hollow extensions and joining said end sections, and a blind raising cord passing over said pulleys and through said tubular intermediate section.

2. In a Venetian blind, a sectional tilt rail comprising two end sections each having a hollow extension, a pulley rotatably mounted in each of said end sections, a cord lock attached to one of said end sections, a tubular intermediate section telescoped over said hollow extensions and joining said end sections, and a blind raising cord passing through said intermediate section and over said pulleys and through said cord lock.

3. In a Venetian blind, a pair of end supports, a tilting mechanism secured to one of said supports, a rail end section having keying means for engagement with said tilting mechanism, another rail end section having a cord lock and a wing member secured thereto, said last mentioned rail end section being rotatable relative to said cord lock and wing member, said wing member being engageable with said other end support, each of said rail end sections having a hollow extension and an intermediate rail section telescoped over said hollow extensions and joining said two rail end sections.

BELA B. JUNKUNC.

REFERENCES CITED

The following references are of record in the file of this patent:

UNITED STATES PATENTS

| Number | Name | Date |
|---|---|---|
| 1,910,335 | Hopp | May 23, 1933 |
| 2,017,210 | Kirsch | Oct. 15, 1935 |
| 2,053,356 | Wiener | Sept. 8, 1936 |
| 2,141,502 | Ajouelo | Dec. 27, 1938 |
| 2,158,826 | Lorentzen | May 16, 1939 |
| 2,222,674 | Lorentzen | Nov. 26, 1940 |